Dec. 14, 1937.　　　　J. C. SMITH　　　　2,102,228
STENCIL

Filed Nov. 3, 1936

INVENTOR.
John C. Smith
BY
Wood & Wood
ATTORNEYS.

Patented Dec. 14, 1937

2,102,228

UNITED STATES PATENT OFFICE 2,102,228

STENCIL

John C. Smith, Beaver, Pa., assignor to Solar Laboratories, Beaver, Pa., a corporation of Pennsylvania Application November 3, 1936, Serial No. 108,951

4 Claims. (Cl. 101—127)

This invention relates to the art of reproducing designs and ornamentation on surfaces through screen membranes which are perforated for stencil purposes. The invention, more particularly, relates to improvements in the stencil screens which are adapted to use in such reproductions, and also to a method by means of which such screens conveniently are mounted on frames to facilitate stenciling therewith.

Generally speaking, the type of screen to which the present invention is directed, comprises a membrane or pellicle of sheet material such as silk, tulle, vegetable fibre, or fine gauge metal gauze. This membrane generally is rendered impervious except for pluralities of perforations arranged in design or lettering configurations. Through these perforations ink or color composition is pressed to the surface intended to be decorated by means of an applicator or squeegee. By reason of the thinness and fragility of the membranes which are used, the membranes usually are stretched across or made to span rigid carrying frames made either of wood or metal.

It has been the practice in the past usually to fasten screens to wood frames either by means of tacks located at spaced intervals, or by means of clamping strips adapted to hold the frames frictionally against the screen in tensioned relationship. Likewise in some instances the membranes have been mounted to the frames by means of adhesives of the type of glue. The difficulty has been that the membranes are apt to be stretched unevenly, or else too loosely, or that the fastenings have been too impermanent to suit the requirements of extended usage of the screens.

The object of the present invention is to provide a new and improved stencil screen unit for reproducing designs, decorations and lettering, in which the screen membrane or pellicle is fastened to the frame much more rigidly and tautly, and also much more stably than in the screen units which heretofore have been available.

It is also an object of the present invention to provide a method for stretching and attaching the screen membrane to the frame which is much quicker and more convenient to perform than the conventional methods which have been referred to.

Other objects and advantages are more fully discussed in the following specification and in the drawing in which.

Figure 1:
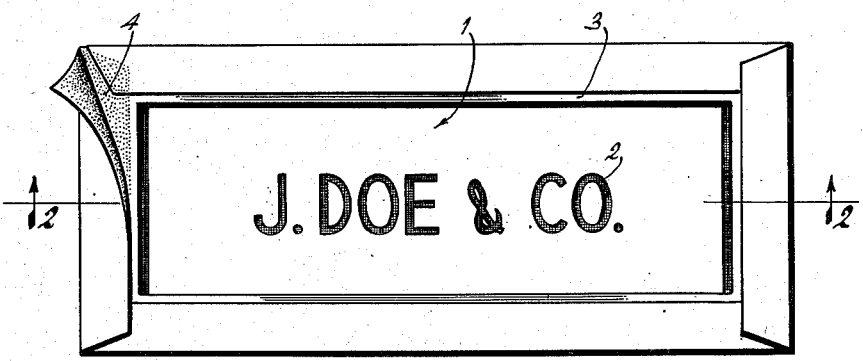
Figure 1 is a plan view showing a frame spanned with a screen or stencil membrane in accordance with the present invention.
Figure 2:
Figure 2 is a cross sectional view taken on the line 2—2 of Figure 1.
Figure 3:
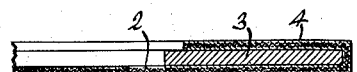
Figure 3 is an enlarged cross sectional view similar to Figure 2 and taken partially on the line 2—2 of Figure 1, to show the integrated relationship of the screen and frame unit of the present invention.

Broadly speaking, the present invention is predicated upon the concept of integrating a stencil membrane to a marginal frame therefor with a heat responsive bonding medium. Otherwise stated it is the concept of the invention to "solder" the membrane to the frame by means of a soldering medium which is plastic when heated, hard and stable when cold, and which integrates readily both with the membrane and with the screen frame, whether it be of wood or of metal, to provide a structure which is substantially unitary in its characteristics.

Referring more particularly to the drawing, the stencil membrane is indicated generally at 1. This membrane is perforated as at 2 to provide stenciling indicia through which ink or similar coating compositions may be forced by means of a squeegee. The nondesign or nonstencil areas are rendered nonporous or imperforate by means of light hardened colloids, by masking, or by means of any one of the conventional methods.

The stencil screen 1 tightly is stretched across a rigid frame 3 which may be made either of wood or of metal.

According to the present invention the stencil screen 1 is integrated with the frame 3 by a heat sensitive bonding medium indicated generally at 4. It is usually preferred to wrap the stencil at the edges around the marginal frame to provide greater bonding area, particularly in the instances where tautness and rigidity are of primary importance. On the other hand, if desired, the screen may be dimensioned to span the marginal frame for fastening to the marginal edge at one face of the frame only.

The soldering medium which is used to integrate the stencil membrane to the frame, comprises a medium which responds to heat by becoming plastic or viscid at temperatures below the temperature at which the material of which the stencil membrane is made is affected adversely. Among the materials which I have found to be well suited in the practice of the invention may be mentioned, shellac, rosin, sealing wax, and natural and synthetic resins of the thermo plastic variety.

The term "thermo plastic" as it is used in the present specification is intended to designate resinous substances which soften to become plastic and viscid at temperatures below the temperature at which disintegration of the stencil membrane tends to occur. The term "thermo plastic" moreover, is intended to designate resins of the variety which become plastic at given temperatures however often they may be heated, as well as resins of the thermo setting variety which are appropriately plastic, or viscid for soldering at certain temperatures and become permanently hard at higher temperatures.

In practicing the present invention the bonding medium is used as solder in fastening the membrane 1 to the frame 3. It is preferable usually to place the membrane on the frame in the intended position, then solder the membrane to the frame by means of a soldering iron or similar hot element in a manner quite similar to the manner in which ordinary soldering with metals is conducted. By reason of the fact that it is usually very desirable to stretch the membrane across the frame as tightly as possible, I prefer to place a few drops of the solder at intervals along one of the marginal edges than "tack" the frame at this marginal edge by heating the membrane and the solder in contact. After this is done the membrane is stretched tightly across the frame and tacked thereto at the opposite marginal edge in a similar manner. After the membrane has been tacked securely at all of the marginal edges of the frame the additional solder is applied and the membrane is fastened to the frame completely.

The next feature of the invention, which is wholly unexpected, resides in the discovery that membranes which are soldered to frames in accordance with the present invention, become very much more tightly stretched during the soldering process than stencil membranes which are fastened in any of the conventional methods, and likewise become much more taut than it is possible to make them by hand stretching. By reason of this phenomena the desired tightness of the membranes is provided without going to the necessity of unusual exertion, as by hand stretching. Consequently, the necessity for extreme care in the stretching operation is obviated.

Having described my invention, I claim:

1. A stenciling unit comprising a metal frame, a stencil membrane spanning said frame, resinous soldering medium integrating the frame and the membrane into a substantially unitary structure.

2. An article of the class described comprising a metal frame, a stencil membrane spanning said frame and marginally soldered thereto.

3. An article of the class described comprising a frame, a stencil membrane tautly spanning said frame and soldered thereto, said solder comprising a heat responsive medium selected from the group which includes shellac, sealing wax, and natural and synthetic thermo plastic and thermo setting resins and gums.

4. The method of framing a pellicular stencil membrane which comprises soldering said membrane to a frame therefor by means of a heat responsive bonding medium.

JOHN C. SMITH.